(12) United States Patent
Choi

(10) Patent No.: US 6,185,420 B1
(45) Date of Patent: Feb. 6, 2001

(54) METHOD AND APPARATUS FOR TESTING THE FUNCTION OF A BASE STATION CONTROLLER IN A CODE DIVISION MULTIPLE ACCESS (CDMA) MOBILE COMMUNICATION SYSTEM

(75) Inventor: Hyuk-Jung Choi, Sungnam (KR)

(73) Assignee: Samsung Electronics Co., Ltd. (KR)

( * ) Notice: Under 35 U.S.C. 154(b), the term of this patent shall be extended for 0 days.

(21) Appl. No.: 09/108,723

(22) Filed: Jul. 1, 1998

(30) Foreign Application Priority Data

Jul. 2, 1997 (KR) .................................. 97-30551

(51) Int. Cl.[7] ....................................... H04B 1/00
(52) U.S. Cl. ......................... 455/423; 455/424; 455/561
(58) Field of Search ................................... 455/67.1, 424, 455/423, 561; 703/21

(56) References Cited

U.S. PATENT DOCUMENTS 5,627,834   5/1997   Han et al. .
5,732,213 * 3/1998   Gessel et al. .................... 395/200.11

* cited by examiner

*Primary Examiner*—Nguyen Vo
*Assistant Examiner*—Makoto Aoki
(74) *Attorney, Agent, or Firm*—Dilworth & Barrese, LLP

(57) ABSTRACT

In a Code Division Multiple Access (CDMA) Mobile Communication System, a method for testing the functionality of a call control processing program executed on a call control processor in a base station controller comprises simulating a mobile switching center that exchanges communications with the base station controller. The functionality of the call control processing program is tested by using the simulated mobile switching center.

10 Claims, 3 Drawing Sheets

FIG. 1 (THE PRIOR ART)

METHOD AND APPARATUS FOR TESTING THE FUNCTION OF A BASE STATION CONTROLLER IN A CODE DIVISION MULTIPLE ACCESS (CDMA) MOBILE COMMUNICATION SYSTEM

FIELD OF THE INVENTION

The present invention relates to base station controllers in Code Division Multiple Access (CDMA) mobile communication systems and, more particularly, to a method and apparatus for testing the functionality of a base station controller in a CDMA mobile communication system.

DESCRIPTION OF THE RELATED ART

A CDMA mobile communication system includes Base station Transceiver Subsystems (BTSs), Base Station Controllers (BSCs), Base Station Managers (BSMs), Mobile Switching Centers (MSCs), and a Location Register system. The BSMs manage the BTSs, and the MSCs perform switching of the calls of mobile stations.

When a base station controller is to be implemented in a CDMA mobile communication system, the interaction between the base station controller and a mobile switching center should be tested to verify that the base station controller functions properly. Disadvantageously, the conventional method for testing the functionality of a base station controller requires that a mobile switching center be almost fully connected to the base station controller.

FIG. 1 is a block diagram illustrating the testing of a base station controller according to the prior art. The base station controller 120 is directly connected with a mobile switching center 150 using a call control processing program (call control S/W) 130 and a mobile switching center interface program (MSC interface S/W) 140 in the base station controller 120. Specifically, the call control processing program activates the base station controller 120, and the mobile switching center interface program allows the mobile switching center to communicate with the base station controller 120. Thus, according to the prior art method, the base station controller 120 is connected with the mobile switching center 150 and communications are exchanged to ensure the base station controller 120 is performing normally.

In order for the conventional method to be used, the elements of the mobile communication system such as, for example, the mobile station 100, the Base station Transceiver subsystems 110, the base station controller 120, and the mobile switching center interface program 140, should be in a normal operating state. As such, when the mobile switching center 150 is operating abnormally or is not interacted with the base station controller 120, the conventional method cannot be used to test the base station controller.

U.S. Pat. No. 5,627,834 discloses an automatic call simulator for simulating call processing capacity and performance between a base station and a mobile station of a CDMA mobile communication system. The automatic call simulator is an external unit connected via a communication port, which operates the mobile station and simulates the performance of the communication system. The automatic call simulator allows the functionality of a base station to be tested without a plurality of subscribers and mobile stations. However, such testing can only be performed if a mobile switching center is provided. Thus, it would be desirable and highly advantageous for a method and an apparatus to be provided for testing the functionality of a base station controller without a mobile switching center.

SUMMARY OF THE INVENTION

It is therefore an object of the present invention to provide a method and apparatus for testing the functionality of a base station controller in a Code Division Multiple Access (CDMA) mobile communication system, where such testing is performed without a mobile switching center.

In one aspect of the invention, in a Code Division Multiple Access (CDMA) Mobile Communication System, a method for testing the functionality of a call control processing program executed on a call control processor in a base station controller comprises the steps of: simulating a mobile switching center that exchanges communications with the base station controller; and testing the functionality of the call control processing program by using the simulated mobile switching center. The simulating step comprises the step of simulating a hardware portion and a software portion of the mobile switching center.

According to one embodiment of the invention, the simulating step is performed using an external processor, and the testing step comprises the steps of: connecting the external processor to the base station controller; and performing call control processing by the base station controller.

According to another embodiment of the invention, the simulating step is performed using a second processor in the base station controller, the second processor being a processor other than the call control processor, and the testing step comprises the step of performing call control processing by the base station controller.

These and other objects, features and advantages of the present invention will become apparent from the following detailed description of illustrative embodiments thereof, which is to be read in connection with the accompanying drawings, where the same reference numerals are used to represent the same functional elements.

DETAILED DESCRIPTION OF PREFERRED EMBODIMENTS

In order to facilitate a clear understanding, the present invention is described with reference to specific embodiments. However, it is to be understood that the invention is not limited to these specific embodiments. Given the teaching of the invention provided herein, one of ordinary skill in the art will be able to contemplate these and other similar implementations of the elements of the present invention.

According to the present invention, a mobile switching center simulation block (hereinafter "simulation block" or "simulator") is utilized to simulate a mobile switching center for the purpose of testing the functionality of the base station controller. The simulation block in accordance with the invention includes both a hardware and a software portion. That is, the simulation block includes simulation software (simulation program) and a processor to execute the software.

In accordance with an embodiment of the present invention, when a call control processing block in a base station controller sends a message to a mobile switching center in order to establish communication with the mobile switching center for testing purposes, a simulation block processes the message in place of the mobile switching center and sends a responding message to the call control processing block. Upon the confirmation (responding message), further testing may be performed in accordance with generally performed communication standards.

Figure 4:
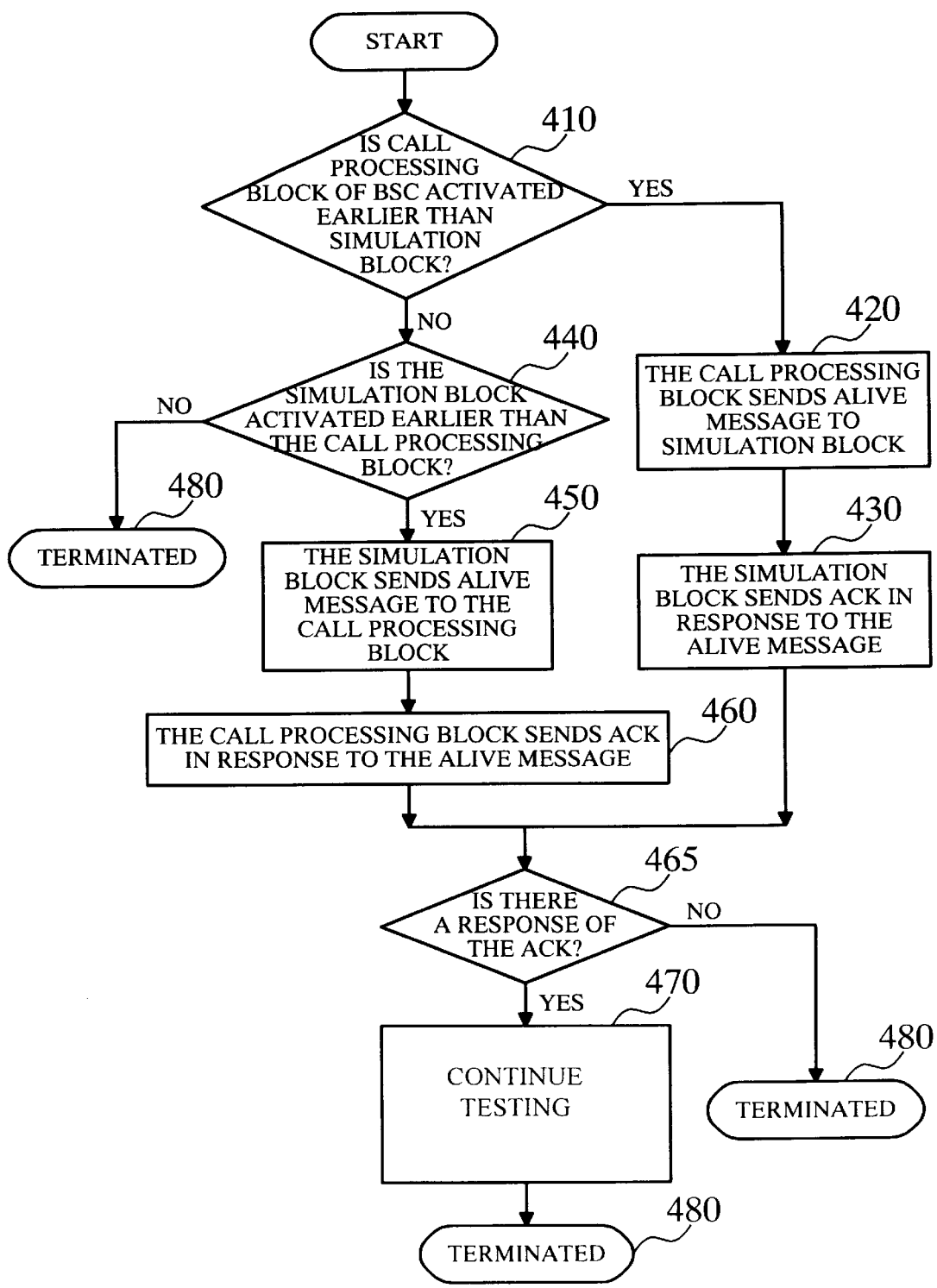
FIG. 4 is a flow chart illustrating a method for testing the functionality of a base station controller according to an embodiment of the present invention.

A method for testing the functionality of a base station controller in accordance with the above described embodiment of the present invention is described in detail with reference to FIG. 4. It is determined whether or not the call control processing block of the base station controller has been activated before the simulation block (step 410). If so, then the call control processing block sends an ALIVE message to the simulation block (step 420) and, in response, the simulation block sends an ACK (Acknowledge) message to the call control processing block (step 430).

However, if the call control processing block has not been activated before the simulation block, then it is determined whether or not the simulation block has been activated before the call control processing block (step 440). If the simulation block has been activated first, then the simulation block sends an ALIVE message to the call control processing block (step 450) and, in response, the call control processing block sends an ACK (Acknowledge) message to the simulation block (step 460). However, if the simulation block has not been activated before the call control processing block, then the method is terminated (step 480).

Next, it is determined whether or not there has been an ACK message sent for either of the above two cases (step 465). That is, it is determined whether or not there has been an interaction between the call control processing block and the simulation block. If not, then the method is terminated (step 480). However, if an ACK message has been sent, then the call control processing block in the base station controller and the simulation block perform further testing according to a communication standard such as, for example, IS-634 or TSB-80, which correspond to the interface between a base station controller and a mobile switching center (step 470). A call release between the call control processing block and the simulation block is also performed according to the communication standard. At this time, the simulation block can process all of the types of calls that are serviced by the call control processing block in the base station controller, such as, for example, mobile-to-mobile, mobile-to-land and land-to-mobile. Additionally, the simulation block performs a process for location registering previously performed by the mobile switching center.

Advantageously, the present invention allows the functionality of a base station controller to be tested with respect to a mobile switching center without actually connecting the base station controller to a mobile switching center. That is, the simulation block according to the present invention allows the interaction between a base station controller and a mobile switching center to be tested, without actually utilizing a mobile switching center.

Figure 1:
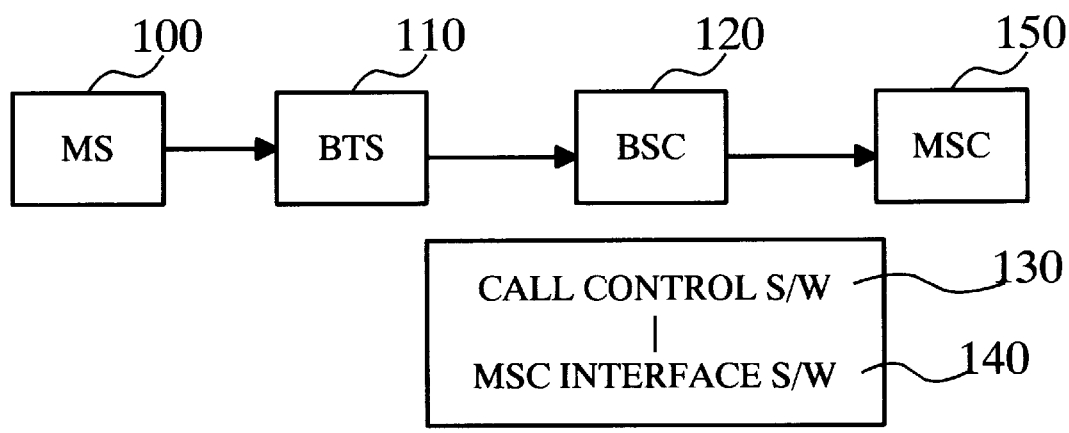
FIG. 1 is a block diagram illustrating the testing of a base station controller according to the prior art.
Figure 2:
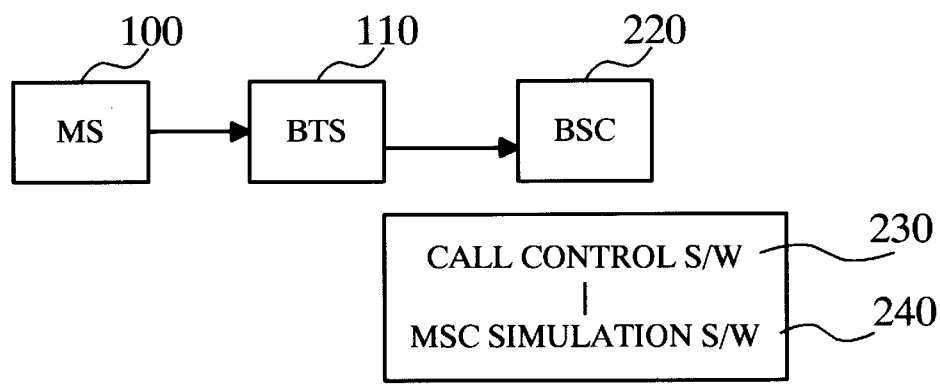
FIG. 2 is a block diagram illustrating a mobile switching center simulation block according to one embodiment of the present invention.

FIG. 2 is a block diagram illustrating a mobile switching center simulation block according to one embodiment of the present invention. The simulation block is inter-connected to a call control processing block in a base station controller to be tested. More specifically, the simulation block is located in a processor of the base station controller and, when inter-connected with the call control processing block in the base station controller, simulates a mobile switching center connected to the base station controller. As such, an operator can then check the interaction between the simulation block and the call control processing block in order to test the functionality of the base station controller. Thus, as stated above, by simply using a simulation block located in a processor of a base station controller, the present invention enables the base station controller to be functionally tested.

According to another embodiment of the present invention, the simulation block is implemented in external hardware which is connected to the base station controller in place of the mobile switching center. That is, the simulation program for simulating a mobile switching center is implemented on a processor which is not located in the base station controller to be tested. This embodiment advantageously prevents potential overloading of the base station controller due to the additional load placed on a processor in the base station controller when the simulation block is simulating the mobile switching center. As an example, an external personal computer (including a processor) may be used to run the simulation program. The personal computer may be inter-connected with the base station controller by, for example, a (communication) port of the base station controller.

Figure 3:
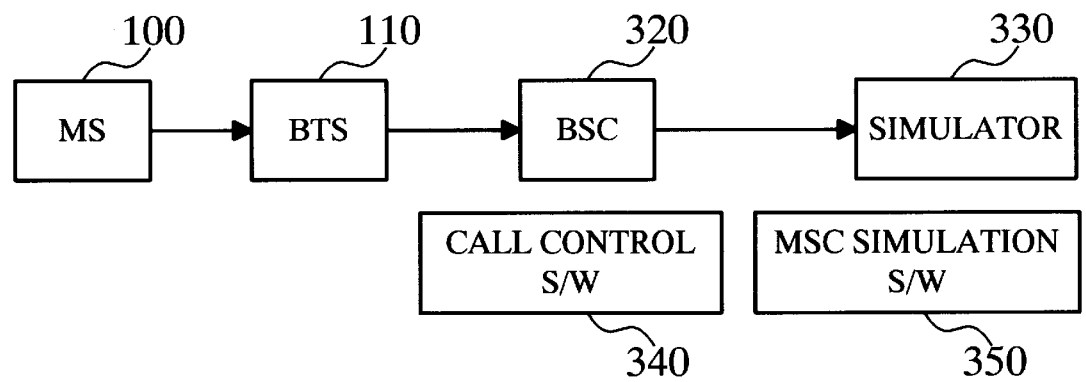
FIG. 3 is a block diagram illustrating a mobile switching center simulation block according to another embodiment of the present invention.

FIG. 3 is a block diagram illustrating a mobile switching center simulation block (simulator) according to another embodiment of the present invention. The simulator 330 is connected to a port of a base station controller 320. The simulator 330 receives messages from the base station controller, processes the received messages, and also sends message to the base station controller. As such, the simulator 330 acts similar to (i.e., simulates) a mobile switching center.

The simulator 330 and base station controller 320 exchange messages based on a communication standard employed between a base station controller and a mobile switching center. Thus, as stated above, an operator can test the functionality of a base station controller with respect to a mobile switching center by interacting the base station controller with the simulator according to the present invention. Advantageously, the present invention allows the functionality of the base station controller to be checked even when the mobile switching center that is to be connected with the base station is operating abnormally.

In sum, the present invention provides a method and an apparatus for testing the functionality of a base station controller. According to the invention, a mobile switching center is simulated so that the a base station controller may be tested without having to actually connect the base station controller to an actual mobile switching center. Thus, functional testing of a base station controller can be performed in the absence of an actual mobile switching center, or in the case that the mobile switching center is operating abnormally. According to one embodiment of the invention, the mobile switching center is simulated in the base station controller to be tested. That is, simulation software for simulating the mobile switching center is implemented on a processor in the base station controller. In another embodiment of the invention, the mobile switching center is simulated in an external processor using the simulation software. The latter embodiment allows a base station controller to be tested without placing an additional burden on a processor of the base station controller.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

I claim:

1. A method for testing the functionality of a call control processing program executed on a call control processor in a base station controller, comprising the steps of:

simulating a mobile switching center that exchanges communications with the base station controller, said simulating being performed using a second processor in the base station controller, the second processor being a processor other than the call control processor, and testing the functionality of the call control processing program by using the simulated mobile switching center, said testing comprising performing call control processing by the base station controller.

2. The method of claim 1, wherein said simulating step comprises the steps of:

sending an acknowledge (ACK) message from the second processor to the call control processor in response to the call control processor sending an ALIVE message to the second processor, when the call control processor is activated before the second processor;

sending an ACK message from the call control processor to the second processor in response to the second processor sending an ALIVE message to the call control processor, when the second processor is activated before the call control processor; and terminating said simulating step, when no ACK message is received after an ALIVE message has been sent by one of the second processor and the call control processor.

3. The method of claim 2, wherein the ACK and ALIVE messages are sent and received based on a communication standard between the call control processor of the base station controller and the mobile switching center.

4. The method of claim 3, wherein the communication standard is one of IS-634 and TSB-80.

5. The method of claim 4, wherein the external processor processes mobile-to-mobile, mobile-to-land and land-to-mobile type calls in order to test the functionality of the call control processing program.

6. An apparatus for testing the functionality of a call control processing program executed on a call control processor on a base station controller, comprising:

a mobile switching center simulator for simulating a mobile switching center, the mobile switching center simulator comprising a second processor in the base station controller, the second processor being a processor other than the call control processor, wherein testing the functionality of the call control processing program uses the simulated mobile switching center and comprises performing call control processing by the station controller, wherein the simulator sends an acknowledge (ACK) message to the call control processor in response to the call control processor sending an ALIVE message to the simulator, when the call control processor is activated before the simulator, and the call control processor sends an ACK message to the simulator in response to the simulator sending an ALIVE message to the call control processor, when the simulator is activated before the call control processor.

7. The apparatus of claim 6, wherein the simulator comprises a second processor in the base station, the second processor being a processor other than the call control processor.

8. The apparatus of claim 6, wherein the simulator comprises an external processor.

9. The apparatus of claim 8, wherein the external processor is contained in a personal computer.

10. The apparatus of claim 6, wherein the base station controller and said simulator transmit and receive messages based on a communication standard between the base station controller and a mobile switching center.

* * * * *